O. F. & C. J. DUNCAN.
SELF-FEEDER FOR HAY PRESSES.
APPLICATION FILED AUG. 6, 1912.
1,073,744.
Patented Sept. 23, 1913.
2 SHEETS—SHEET 1.
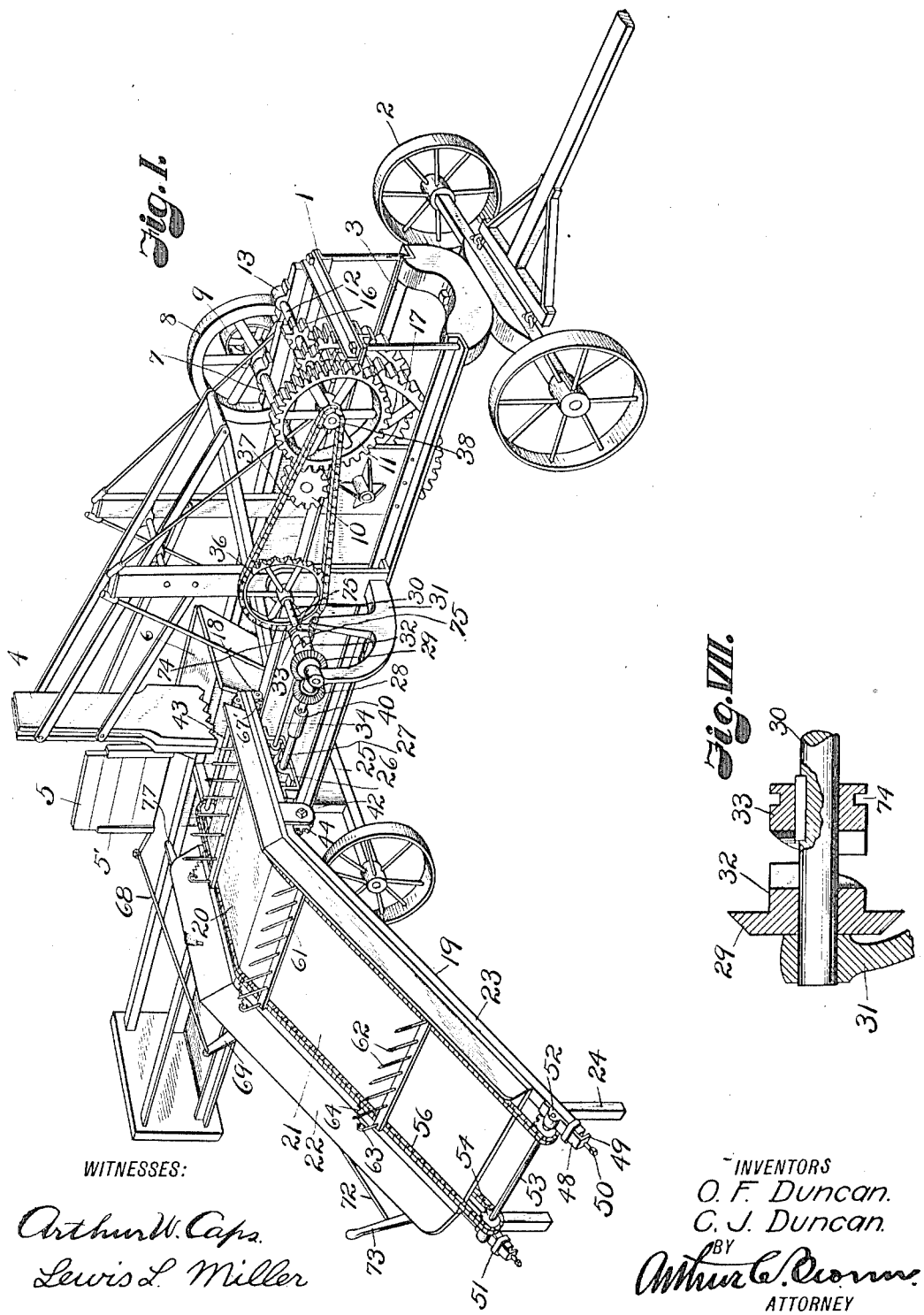
WITNESSES:
Arthur W. Caps.
Lewis L. Miller
INVENTORS
O. F. Duncan.
C. J. Duncan.
BY
Arthur C. Brown
ATTORNEY

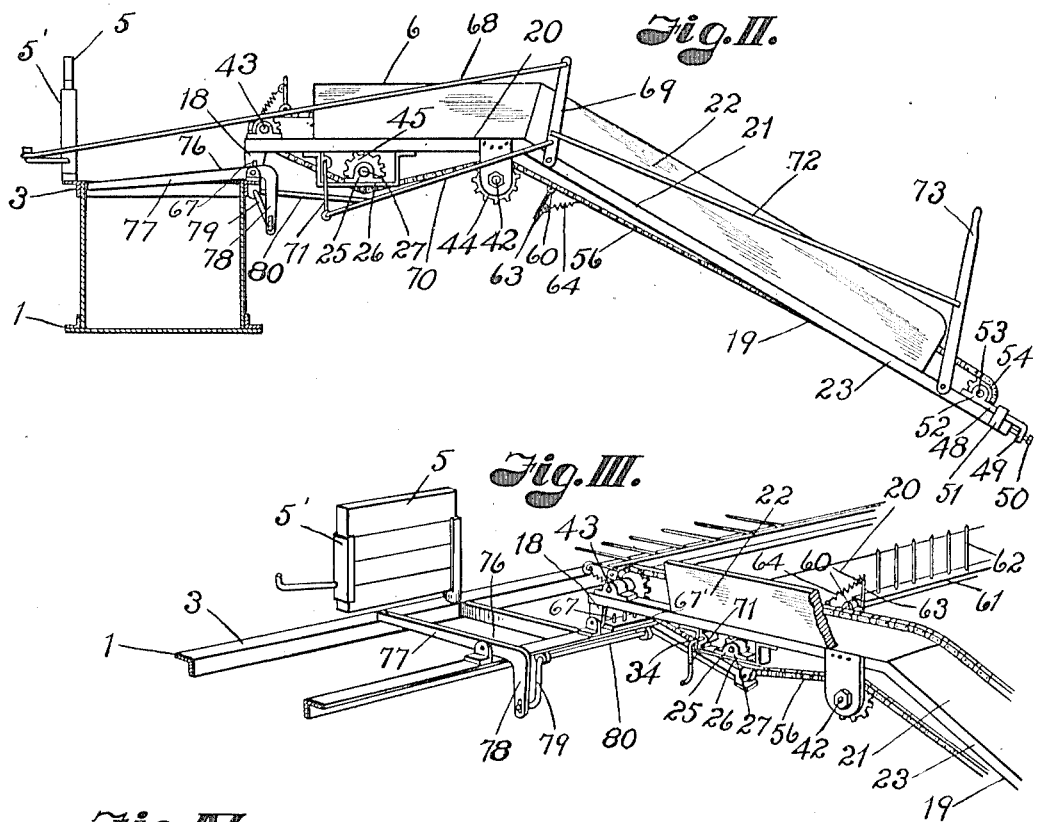
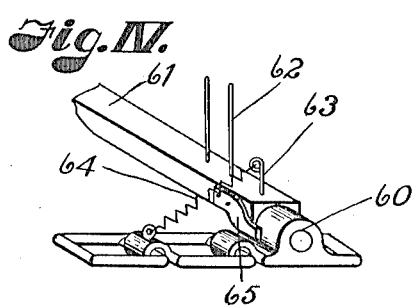
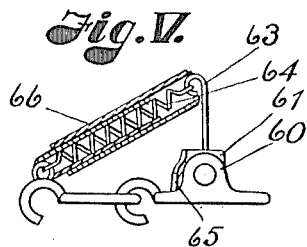
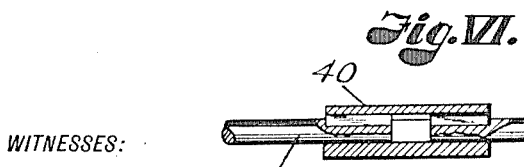

UNITED STATES PATENT OFFICE.

ORVIL F. DUNCAN AND CLAUDE J. DUNCAN, OF GRIDLEY, KANSAS.

SELF-FEEDER FOR HAY-PRESSES.

1,073,744.

Specification of Letters Patent. Patented Sept. 23, 1913.

Application filed August 6, 1912. Serial No. 713,529.

*To all whom it may concern:*

Be it known that we, ORVIL F. DUNCAN and CLAUDE J. DUNCAN, citizens of the United States, residing at Gridley, in the county of Coffey and State of Kansas, have invented certain new and useful Improvements in Self-Feeders for Hay-Presses; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

Our invention relates to feeders for hay presses, and has for its principal object to provide a conveyer for delivering charges of hay into a hopper, together with certain devices for simultaneously controlling the conveyer and actuating or locking parts of the hay press.

A further object of the invention is to provide the new and improved details of structure hereinafter described and illustrated in the accompanying drawings, in which:—

Figure I is a perspective view of a hay press equipped with a feeder constructed in accordance with our invention. Fig. II is a side elevation of the feeder, showing a portion of the hay press. Fig. III is a perspective view of a portion of the feeder and hay press, showing mechanism for actuating and locking the division board. Fig. IV is a perspective view of a portion of the conveyer, showing the means for connecting the slats to the driving chains. Fig. V is a side elevation of same, a covering for the spring being in section. Fig. VI is a sectional view of the conveyer drive shaft mounting. Fig. VII is a sectional view of the clutch.

Referring more in detail to the parts:—

1 designates a hay press of ordinary construction comprising running gear 2, a frame 3, beater 4, division board 5, hopper 6 and driving shaft 7, the latter having a fly-wheel 8 and belt pulley 9 at one end, and having a pinion 10 on the opposite end that meshes with a large gear 11 rigidly mounted on a shaft 12 that is journaled in bearings 13 on the press body.

On the central portion of shaft 12 are pinions 16 which mesh with large gears 17 that are adapted to actuate the beater 4 and a plunger (not shown), the parts mentioned in themselves forming no part of the present invention, and being illustrated and described to this extent merely to give a better understanding of the following improvements.

Connected with the press, adjacent the hopper, preferably by hinges 18, is a conveyer 19, comprising hingedly connected and inclined sections 20—21, having side members 22 and having sills 23, the sills being projected slightly from the ends of the body portion, and the lower ends of the sills having legs 24 whereby the conveyer is supported from the ground.

Journaled in bearings 25, which are supported by brackets 26 on the under side of the conveyer, is a drive shaft 27 having a beveled gear 28 meshing with a like gear 29 on a shaft 30 which is journaled in the side of the press and in a bracket 31 carried by and projecting laterally from the press, the beveled gear 29 being preferably revoluble on its shaft and provided with a clutch member 32 which is adapted for engagement with a member 33 which is splined on the shaft and controlled by a lever 34 that extends beneath the conveyer and is operated as and for a further purpose presently described.

A sprocket wheel 36 on the shaft 30 carries a belt 37 which receives its power from the shaft 12 through a sprocket wheel 38 and is adapted for driving the clutch shaft constantly when the press is in use.

In order to free the conveyer drive shaft 27, when the conveyer is to be folded up against the press, we break the shaft and provide the two sections with a sliding collar 40 (Fig. VI), which is adapted to move over the shaft ends to join same together or to move entirely away from the short end of the shaft when the latter is to be broken, the collar being splined on the shaft sections so that one may be driven from the other.

Suspended from the horizontal section of the conveyer, adjacent to drive shaft 27, is a shaft 42 and on the shaft 42, and journaled in bearings supported on the ends of the sills of the horizontal portion of the conveyer, is a shaft 43, both having sprocket wheels 44 in alinement with the sprocket wheels 45 on the shaft 27.

Slidably mounted on the projecting ends of the sills on the lower end of the conveyer extension are straps 48 having down-turned

and stop the conveyer so that the charge already in the hopper will be compressed before another charge is delivered. After compression, the next charge is sent up the conveyer and compressed, the division board being swung into place after each delivery and the operation of the conveyer being stopped between the compression of the charges.

It is apparent that the device may be easily and perfectly controlled from the operator's position and that there is a minimum of liability of the parts being damaged because of the automatic stopping of the division board frame when the conveyer is delivering a charge.

Having thus described our invention, what we claim is new therein and desire to secure by Letters-Patent, is:

1. The combination with a hay press having suitable driving mechanism, of a feeder adapted for actuation from the driving mechanism for the press, and a single mechanism for controlling actuation of the feeder and of a working part of the press.

2. In a feeder for hay presses, the combination with a main driving mechanism, of a feeder comprising a conveyer having clutch connection with the main driving mechanism, and a single lever for actuating said clutch and controlling a part of the press.

3. The combination with a hay press having suitable driving mechanism and having a movable division board frame, of a conveyer having clutch connection with the main driving mechanism, and a single controlling device connected with the clutch and with the division board frame, for the purpose set forth.

4. The combination with a hay press having suitable driving mechanism, and having a movable division board frame, a conveyer having clutch connection with the driving mechanism, and a single control mechanism connected with the clutch and with the division board frame whereby the clutch is closed when the frame is in open position and opened when the frame is in closed position, substantially as set forth.

5. The combination with a hay press having suitable drinking mechanism and a movable division board frame, of a conveyer having clutch connection with the driving mechanism, a crank arm having operative connection with the clutch, a crank arm on the division board frame, a single lever having link connection with both of said crank arms, and a handle connected with said lever whereby the clutch and division board frame are actuated synchronously, substantially as set forth.

6. The combination with a hay press having driving mechanism and a division board frame, of a conveyer having spaced slat members and having operative connection with the main driving mechanism, means for actuating the division board frame and a stop member operable from the conveyer and adapted for engagement with the division board frame, for the purpose set forth.

7. The combination with a hay press, of a conveyer comprising belts and spaced slats carried by the belts, a division board frame movably mounted on the press, means for moving the frame to open or closed position, a stop member operable by the conveyer and adapted for projection into the path of the division board frame when any of the slats are in fitting position, substantially as set forth.

8. The combination with a hay press having driving mechanism, and a movable division board frame, of a conveyer comprising belts and slats arranged in spaced relation on said belts, clutch mechanism for actuating the conveyer from the main driving mechanism, a single controlling device for actuating the clutch and the division board frame, and a stop lever having an arm adapted for actuation by one of the conveyer belts to drive a second arm into the path of the division board frame, substantially as and for the purpose set forth.

9. The combination with a hay press comprising a hopper and having a suitable driving mechanism, of a conveyer comprising belts having paired bearing links, a slat revolubly mounted in each pair of bearing links and having pins projecting from one face thereof, a spring on each of said slats for holding same in upright position, a stop arm for holding said slats against the tension of their springs, and means for driving the conveyer from the main driving mechanism whereby the slats are carried over the press hopper, substantially as and for the purpose set forth.

In testimony whereof we affix our signatures in presence of two witnesses.

ORVIL F. DUNCAN.
CLAUDE J. DUNCAN.

Witnesses:
LEWIS L. MILLER,
LETA E. COATS.